June 8, 1943.　　　W. DE BACK　　　2,321,016
APPARATUS FOR TREATING FOODSTUFFS
Filed May 23, 1941　　　3 Sheets-Sheet 1
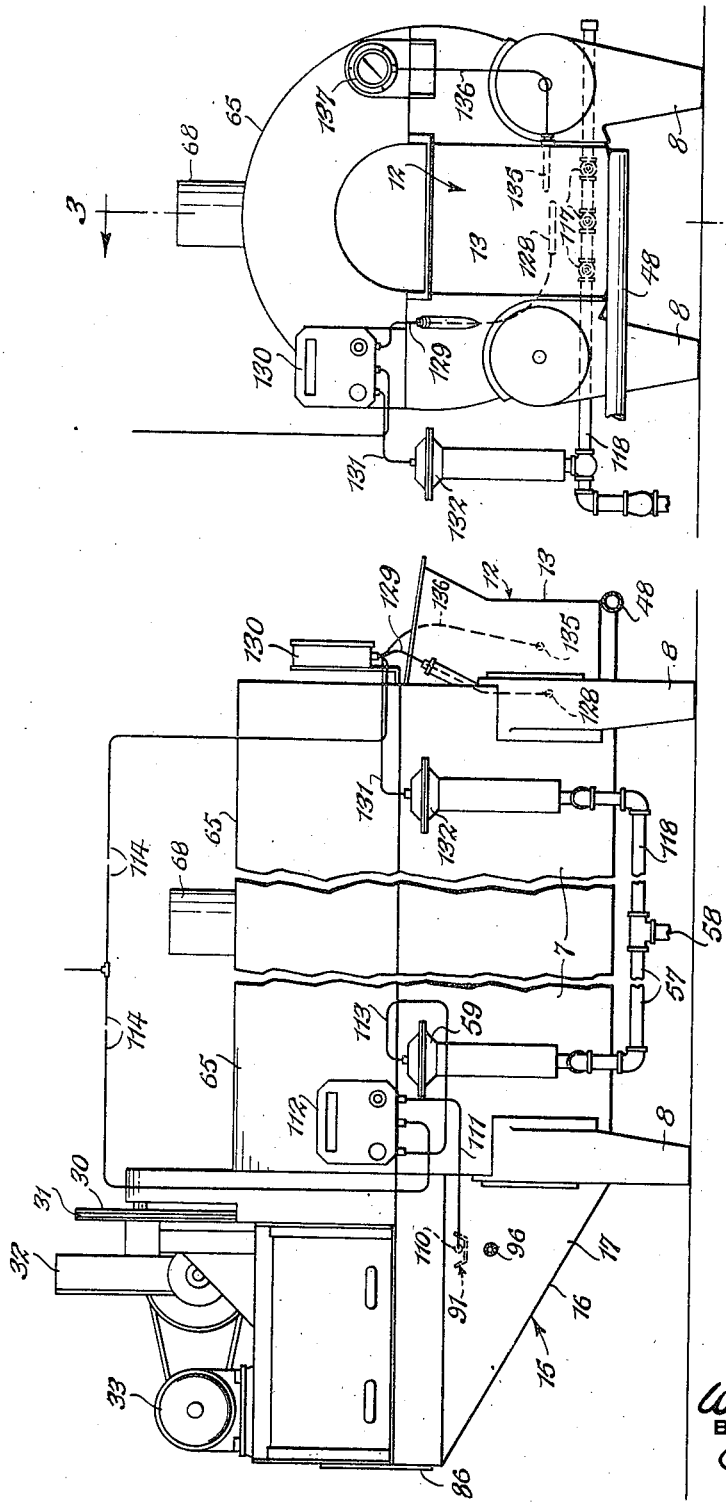
INVENTOR
William de Back
BY
Popps and Popps
ATTORNEYS

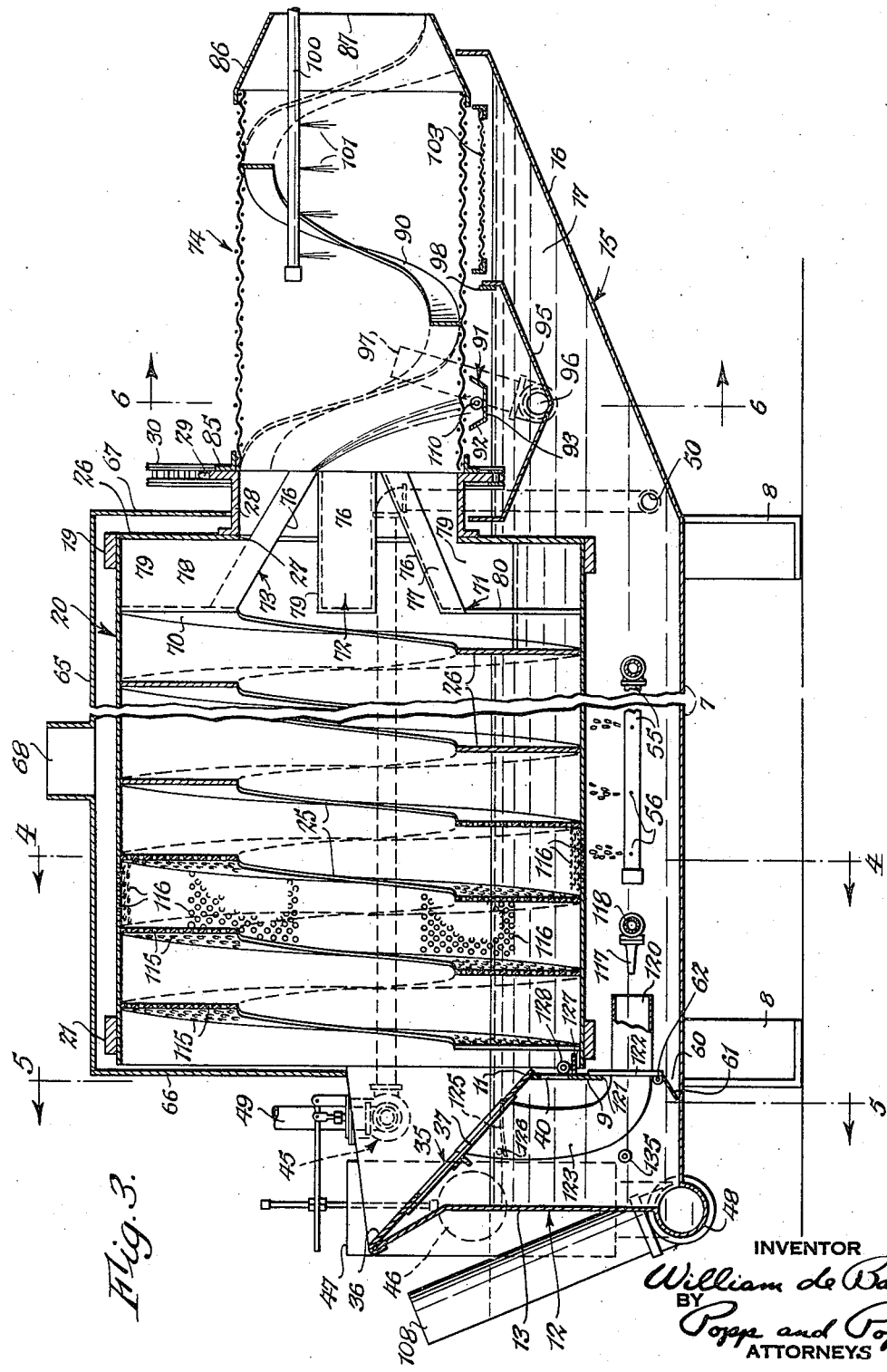

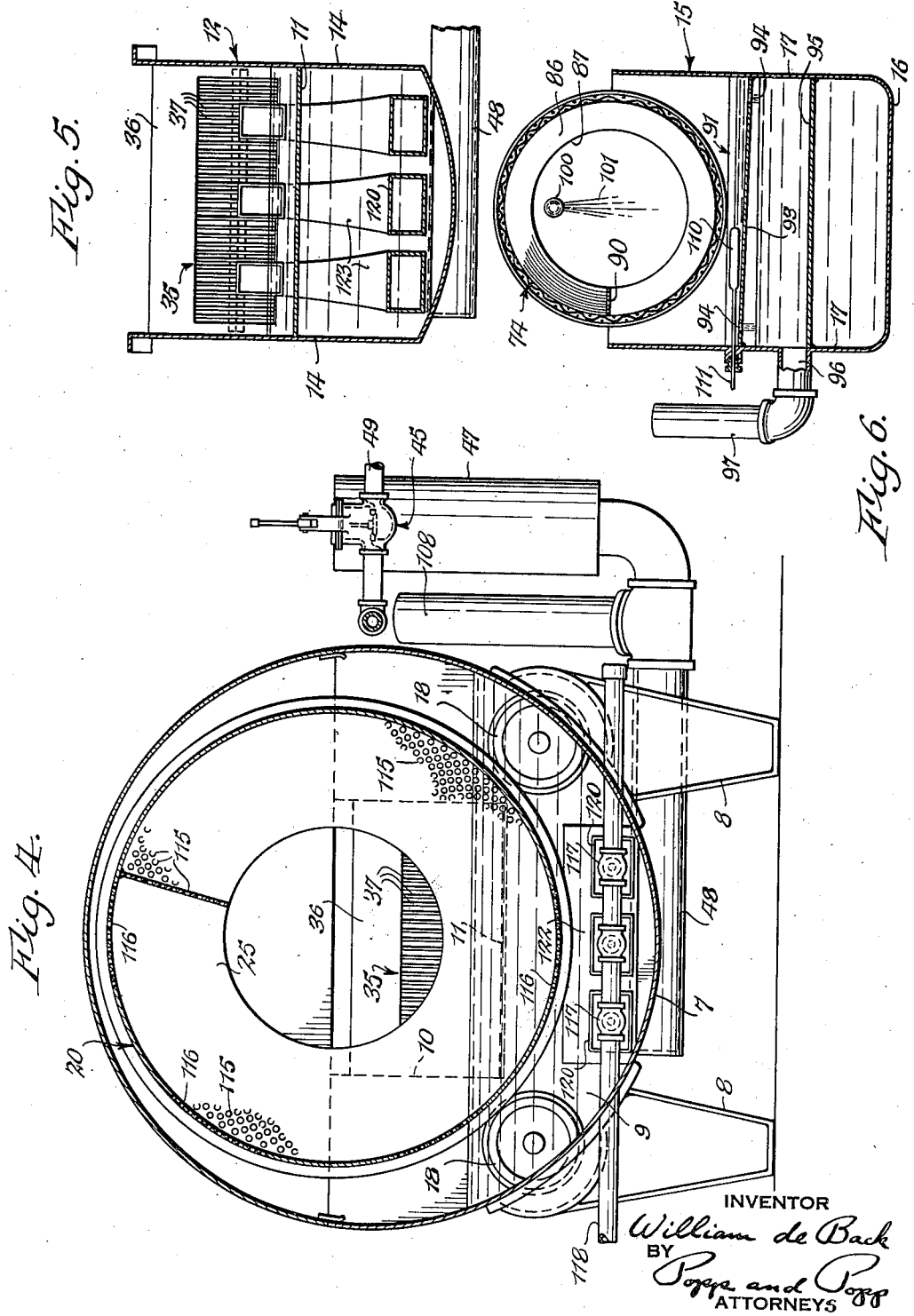

Patented June 8, 1943

2,321,016

UNITED STATES PATENT OFFICE 2,321,016

APPARATUS FOR TREATING FOODSTUFFS

William de Back, Niagara Falls, N. Y., assignor to Chisholm-Ryder Company, Incorporated, Niagara Falls, N. Y., a corporation of New York Application May 23, 1941, Serial No. 394,875

12 Claims. (Cl. 146—194)

This invention relates to a method and apparatus for treating foodstuffs, such as vegetables, and more particularly to a method and apparatus for blanching foodstuffs in which the foodstuffs to be blanched are passed in small individual batches, together with enough liquid to cover the materials, in succession through a heated chamber, following which the batches are drained and can be rinsed.

This application is a continuation in part of my copending United States Patent applications, Serial No. 289,858, filed August 12, 1939, and Serial No. 335,115, filed May 13, 1940, for Apparatus and method, respectively, for treating foodstuffs.

It was found in the type of apparatus to which the present invention and my said copending applications relate, that is, apparatus having an open ended imperforate rotary drum partially immersed in a tank of hot liquid and having an internal helix to separate the liquid into independent batches, and also having means for feeding the foodstuffs to be treated to the leading end of the helix to be conveyed in said separate batches of liquid to draining apparatus at the trailing end of the helix, that during a very substantial part of the movement of the foodstuffs through the drum they were merely being heated to the treating temperature, the actual treatment taking place during the subsequent movement of the foodstuffs in the drum. This necessitated the use of a long drum since it served not only as a treating chamber, but also as a preheating chamber, the preheating of the foodstuffs extending as much as half the length of the drum. Further, difficulties were encountered in accurate and sensitive temperature control of the process since the amount of preheating required depended upon the amount and initial temperature of the foodstuffs being processed, both of which were subject to fluctuation.

It is therefore the principal object of the invention to provide such an apparatus and process in which the temperature of the foodstuffs being treated is rapidly brought up to the treating temperature thereby to reduce the length of the treating chamber and to increase the rapidity of the process and the capacity of the apparatus.

Another object is to provide such preheating step and apparatus in which the heating medium is under independent thermostatic control, thereby rendering the amount of preheating instantly responsive to variations in the temperature and quantity of the foodstuffs being introduced and permitting a more uniform temperature control of the entire treating process.

Another object of the invention is to provide such a process and apparatus which is applicable to the apparatus and process forming the subject of my said copending patent applications, thereby to retain all the advantages set forth therein.

Another object is to provide an improved temperature control for the treating process.

Another object is to provide such an apparatus which is comparatively inexpensive and simple in construction and operation; which is readily maintained in a clean and sanitary condition and which will stand up under conditions of severe and constant use without getting out of order or requiring repairs.

Other objects and advantages will appear from the following description and the accompanying drawings in which:

Fig. 1 is a fragmentary side elevation of a rotary blancher embodying my invention.

Fig. 2 is an end view thereof.

Fig. 3 is a fragmentary, vertical, longitudinal section, on an enlarged scale, taken on line 3—3, Fig. 2.

Figs. 4, 5 and 6 are vertical transverse sections, taken on the correspondingly numbered lines on Fig. 3.

The invention is shown as embodied in a blancher for blanching vegetables, such as peas, although it will be understood that the scope of the invention is not necessarily limited to blanching and that the process can be used, for example, in treating foodstuffs with magnesium chloride or other materials. The blancher is shown as including a tank 7 which is illustrated as being semi-cylindrical in cross section and as suitably supported on legs 8. At one end this tank is provided with an end head 9 in the form of a generally semi-cylindrical vertical wall welded at its edges to the semi-cylindrical shell of the tank 7 and provided with a large central rectangular recess 10 forming a horizontal edge 11 over which the vegetables to be treated are fed into the apparatus. Below the horizontal edge 11 the end head 9 is provided with a plurality of openings which provide communication between the tank 7 and an extension 12 of the tank 7, this extension having an end wall 13 which is connected with vertical side walls 14, the inner vertical edges of these side walls 14 being welded or otherwise secured to the end head 9 of the tank 7 on opposite sides of its rectangular recess 10 and the bottom of the extension 12 being formed by a continuation of the bottom of the tank 7. The opposite end of the tank 7 is provided with an extension 15 having an inclined lower wall 16 and side walls 17.

The tank 7 is shown as carrying four drum supporting rollers 18, one pair of these rollers being located at one end of the tank and rotatably supporting a metal tire or ring 19 of a cylindrical horizontal metal drum 20 and the other pair of rollers 18 supporting a similar ring or tire 21 at the opposite end of the drum 20. The drum 20 provides the blanching or treating chamber and is internally provided with a helical strip 25, the greater part of the length of this strip 25 being imperforate and being secured to an imperforate part of the drum 20 to provide a liquid-tight helical channel 26 in the drum and thereby form a screw for positively conducting foodstuffs and the treating liquid from adjacent the inlet end of the drum 20 to the outlet end thereof in separate, independent batches. The outer edge of the helix 25 is preferably welded to the interior of the drum 20 and is of sufficient depth to permit the drum to convey both the treating liquid and the foodstuffs to be treated positively and in separate, independent batches to the discharge end of the drum. The inner diameter of this helix is preferably large enough to permit a person to enter the drum 20 for the purpose of cleaning the screw or repairing the same.

At its discharge end the drum 20 is provided with a circular end head 26 which has a coaxial opening 27 through which the treated materials are discharged. To this end head is secured a circular concentric casting 28 which forms a discharge neck and is also formed to provide a strocket 29, this sprocket being driven by a drive chain 30 from another sprocket 31 driven through a speed reducer 32 from an electric motor 33, as shown in Fig. 1. It will therefore be seen that as the sprocket 29 is turned by the drive chain 30 the drum 20 is rotated and the materials fed to the leading end of the screw 25 will be separated into individual batches, these batches being moved in succession lengthwise of the drum 20.

The materials so supplied to the inlet end of the drum 20 comprise the vegetables to be blanched or otherwise treated and sufficient preheated water or other treating liquid to cover the vegetables. To supply the vegetables, a bar screen 35 is removably mounted in any suitable manner in the extension 12 of the tank 7, this bar screen comprising an inclined frame 36 which is formed to hook over the end wall or head 13 of the extension 12 with its lower edge resting upon the horizontal bottom edge 11 of the large central recess 10 in the end head 9 of the tank 7. This frame 36 is open at its center and this opening is covered by a plurality of bars 37 which are arranged parallel to the axis of the drum 20 so that vegetables dumped upon the bar screen 35 flow down these bars over the horizontal lower edge 11 of the central recess 10 of the end head 9 of the tank 7 to the leading end of the screw 25 in the rotary drum 20.

This leading edge of the screw 25 also withdraws, each time it rotates, a batch of blanching water sufficient to cover the vegetables so fed to the leading edge of the screw. This blanching water is supplied to this leading edge of the screw through the opening in the bar screen frame 36. Communication between the liquid in the feed end of the blanching drum 20 and the liquid in the extension 12 of the tank 7 is also provided through an opening 40 provided in the end head 9 of the tank 7 immediately under the lower edge 11 of the large central recess therein, as best shown in Fig. 3.

The water or other blanching liquid admitted to the tank 7 is under control of a float valve 45, the float 46 of which is preferably arranged in a tank 47 which is connected with the extension 12 of the main tank 7 by a duct 48. The float 46 is therefore responsive to the level of the water or blanching liquid in the tank 7 and operates to control the admission of fresh liquid from a supply pipe 49 to a water inlet 50 in the tank extension 15 at the opposite end of the tank 7. The float valve 45 can be adjusted to maintain any desired level in the tank 7 and hence in the drum 20, the drum 20 being submerged in this water to an extent sufficient to provide the necessary amount of water for covering the batches of vegetables picked up by the leading end of the screw 25.

Heat for blanching the materials conveyed in separate batches by the screw 25 is shown as in part supplied by a steam pipe 55 arranged longitudinally under the center of the drum 20 and having a plurality of openings 56 in its upper part through which steam is discharged, this steam preheating the blanching water flowing through the tank 7 toward its left hand end, as viewed in Fig. 3, and also rising to heat the drum 20 and hence the batches of materials being conveyed therethrough. This steam is supplied through one branch 57 of a steam supply pipe 58 which is arranged externally of the blancher, as shown in Figs. 1 and 2, and the steam so admitted to the steam pipe 55 is under control of a diaphragm valve 59 as hereinafter explained.

The addition of fresh water or branching liquid through the inlet 50 is made in the extension 15 of the tank 7 and it will therefore be seen that this water must be preheated by the steam pipe 55 before being mixed with the material to be blanched. Further, it will be seen that the rotation of the drum 20, the movement of the water through the tank 7 toward the inlet end of this drum and the agitation provided by the steam issuing through the ports 56, serve to maintain a uniform water temperature in the water admitted to the lead end of the screw 25. The water flowing through the tank 7 toward its left hand end, as viewed in Fig. 3, flows through an opening 60 provided in the extreme lower end of the end head 9 of the tank 7 and thence flows upwardly to the lead end of the screw 25 through the bar screen 35. A reverse flow of the water is preferably prevented by a valve closure 61 which is hinged to the end head 9 immediately above the opening 60, as indicated at 62, and which closes this opening in the event of a reverse flow of the water and permits the water to flow only from the tank 7 into the extension 12 but prevents a reverse flow.

The blanching drum 20 and tank 7 are preferably hooded to prevent the escape of steam except through the proper vents. For this purpose a semi-circular hood 65 is provided, the lower edges of which rest upon the upper edges of the semi-cylindrical tank 7, as best shown in Fig. 4, and this hood being provided with an end head 66 across the inlet end of the drum 20 and an end head 67 at the other end of the drum 20. This hood is shown as provided with a vent 68 through which the vapor escapes.

The trailing end 70 of the screw 25 terminates short of the circular end head 26 of the drum and three buckets 71, 72 and 73 are provided for lifting the blanched materials and water from the space between the screw and the end head 26 and discharging them through the neck 28 into a rotary screen 74. For this purpose each of the discharge buckets comprises a chute having an inner plate 76 and side walls 77 and 78, the chutes inclining toward one another and toward the discharge opening in the casting 28 and the wall 78 of each chute extending radially outward, as indicated at 79, to engage the end head 26 and the adjacent inner face of the drum 20. With the chutes 71 and 72 radial plates 80 are provided, each of which is secured to the inner edges of the corresponding plates 76, 77 and 78 and is also welded to the adjacent inner surface of the drum 20 so as to form a bucket which lifts the material from the space inside of the drum 20 beyond the trailing helix of the screw 25 and discharges the material into the chute formed by the plates 76, 77 and 78 when the bucket assumes the elevated position of the bucket 73, Fig. 3, the inclination of this chute in this position discharging this material into the rotary screen 74, as shown. The bucket 73 is arranged at the trailing end 70 of the screw 25 and hence with this bucket the plate 80 is eliminated, the trailing end of the screw being substituted for these plates.

It will be noted that the plates 80 of each of the buckets 71 and 72 are in the same vertical transverse plane as the trailing edge 70 of the screw 25. Since the final helix of the screw 25 is spaced a greater distance from the plate 80 of the bucket 71 than the plate 80 of the bucket 72, it will be seen that the bucket 71 picks up only a part of the material between the final helix of the screw 25 and the end head 26 of the drum. As the next bucket 72 rotates to the bottom of the drum 20 it will pick up an additional amount of the material trapped between the final helix of the drum 20 and the end head 26. Since the trailing end 70 of the screw forms a part of the bucket 73, it will be seen that the remainder of such trapped material will be picked up and discharged by this bucket 73. Therefore, each batch of material conveyed beyond the final helix of the screw 25 is picked up and discharged into the screen 74 in three separate batches, this avoiding injury to tender materials during a transfer to the rotary screen and also providing a moderate, uniform feeding of material to the rotary screen.

The screen 74 rotates with the drum 20 and for this purpose is secured to the end of the circular casting 28 by a ring 85, or in any other suitable manner. The screen 74 carries at its opposite end a sheet metal head 86 of frusto-conical form to provide an opening 87 of reduced diameter through which the blanched materials are discharged from the apparatus.

The rotary screen 74 carries an internal helical flight 90 which conveys the blanched materials axially of the screen and discharges these materials through the opening 87. The water or other blanching liquid discharged by the buckets 71, 72 and 73 passes through the rotary screen 74 into a transverse trough 91 which is arranged in and extends transversely the full width of the extension 15 of the tank 7, as best illustrated in Figs. 3 and 6. This trough is arranged immediately under the screen 74 and is shown as having comparatively shallow side walls 92 and an inclined bottom wall 93. At each of its ends this bottom wall 93 is provided with drain openings 94 which permit the water so discharged into the trough 91 by the buckets 71, 72, 73 to flow through the trough so as to prevent stagnation of the water therein. The water so draining through the orifices 94 in the bottom of the trough 91 is caught by a separate discharge basin 95 which is arranged in and extends transversely the full width of the extension 15 of the tank 7, as best shown in Fig. 6. This discharge basin has a waste outlet 96 connected with an adjustable overflow pipe 97. This adjustable overflow pipe 97 is capable of being swung, lengthwise of the apparatus, to any angle so as to discharge all or any desired proportion of the spent water caught by the basin 95. One wall of the basin 95 is formed to provide an adjustable overflow dam having for this purpose a plate 98 which can be adjusted vertically to any desired position. It will be seen that upon adjusting the overflow pipe 97 and the overflow dam 98, any desired proportion of the spent water caught by the basin 95 can be returned to mix with the fresh water from the inlet 50 for reuse in the blanching process.

If desired the blanched drained materials can be washed by water or other suitable wash liquid before being discharged through the opening 87 in the discharge end of the rotary screen 74. For this purpose a wash liquid pipe 100 is provided which extends into the screen 74 through this opening 87 and is drilled to provide downward jets 101 which wash the materials conveyed axially along the screen 74 after passing beyond the basin 95. To catch any debris washed from the blanched materials by the sprays 101 a removable screen 103 is arranged under the rotary screen 74 below the sprays 101. The wash liquid draining from the blanched materials is thereby caught by the removable screen 103 which separates any debris from this liquid, the liquid thereafter mixing with the liquid used for blanching. It will be noted that by this means the blanched materials are cooled before being discharged from the screen 74 and at the same time the wash liquid is heated by this blanched material before being mixed with the liquid used during the blanching operation. It will also be noted that the screen 103 can readily be removed and cleaned and that the frusto-conical form of the head 86 serves to insure the return of wash liquid to the screen 103.

The level of the water or liquid in the tank 7 can also be adjusted to a maximum amount by an overflow pipe 108 which is connected to the duct 48 and is capable of being swung to any position so as to discharge a greater or less quantity of the water from the tank 7 and maintain any desired level.

The purpose of the small trough 91 is to provide for the control of the general temperature of the blanching water or liquid. To this end, a thermostat 110 is arranged in this trough and hence is subject to the temperature of the water discharged with the blanched materials from the blanching drum 20. The holes 94 in this trough prevent stagnation of the water in this trough so that the thermostat 110 is accurately responsive to the temperature of the spent blanching water, inasmuch as this water is poured directly into this trough by the buckets 71, 72 and 73, as best illustrated in Fig. 3. The outlet line 111 from this thermostat, as best shown in Fig. 1, extends to an instrument box 112, through which it connects with a line 113 controlling the diaphragm valve 59 in the branch 57 of the steam main 58 and hence this thermostat controls the admission of steam to the heating pipe 55 arranged in the tank 7 under the blanching drum 20. Air pressure for this controlled operation of the diaphragm valve 59 can be supplied through a supply line 114 leading to the instrument box 112.

It has been found, however, that the control under the thermostat 110 is not sufficient alone to secure proper blanching with the minimum length of the blanching drum 20. Thus, while this thermostat will maintain the proper temperature of the blanching water, the vegetables to be blanched are generally introduced into the blanching drum in a cool or cold condition and hence these vegetables must travel a good part of the length of the blanching drum before they are even brought up to blanching temperature. Under such conditions it will be appreciated that the leading convolutions of the blanching drum 20 merely serve as a preheater and that the drum must be made unnecessarily long to serve the dual capacity of an extended preheater and of a blancher. Further, the vegetables to be blanched are introduced at widely different temperatures. Therefore, with only the control as heretofore described in detail, the very cold articles would travel a long distance through the drum before being preheated to blanching temperature whereas the warm articles would travel a short distance. This not only required making the drum sufficiently long to properly preheat and blanch the very coldest articles but also rendered the processing variable in accordance with the initial temperature of the articles.

To permit of the use of a blanching drum of smaller size and to quickly and uniformly bring the vegetables up to blanching temperature regardless of their initial temperature and to secure accurate and quickly responsive control of such rapid preheating of the vegetables, means are provided which are preferably constructed as follows:

The first few convolutions of the helical strip or screw 25 are shown as being perforated, as indicated at 115, so that the blanching water or liquid contained in the feed end of the blanching drum 20 is free to circulate through these convolutions. Similarly the corresponding part of the drum 20 itself, that is, the part of this drum surrounding and carrying these first few perforated convolutions of the strip 25, is provided at spaced intervals with groups of perforations 116, so that the blanching water or liquid so contained in the feed end of the blanching drum 20 is free to flow from the drum into the main body of liquid contained in the tank 7.

Such flow is induced by a plurality of steam jets 117 which are immersed in the main body of water contained in the tank 7 and are shown as carried by and supplied with steam from a transverse steam pipe 118 which extends through the bottom of the tank 7 and connects with the steam main 58, as best shown in Fig. 1. Three steam jets 117 are shown, these being directed toward the end head 9 of the tank 7 and each discharging into the open inlet end of a conduit of the lower horizontal arm 120 of a conduit, each of these conduits extending through an opening 121 in the end head 9 of the blancher, the lower arm 120 of each conduit being provided with a flange 122 which can be removably secured to the end head 9 in any suitable manner. The vertical arm 123 of each conduit extends through an opening provided in the bars 37 of the bar screen 35 so that the water forced into the lower arm 120 of this conduit is discharged, together with the vegetables passing down the bar screen 35 into the inlet end of the blanching drum 20. To prevent vegetables from flowing down the vertical arms 123 of these conduits a trap door 125 is provided in the upper end of each of the arms 123. Each of these trap doors is shown as pivoted at 126 and as having its free ends resting on the opposite edge of the vertical branch 123 of its conduit. It will therefore be seen that the trap door is free to rise to permit the flow of water, induced by the steam jets 117, to flow into the inlet end of the drum 120 but that these trap doors close to prevent a reverse flow of vegetables down the branches 123 which would otherwise occur when the jets 117 were not in operation.

As previously described, the end head 9 is provided with an opening 40 immediately under the discharge edge of the inclined frame 36. This opening 40 permits a sluggish flow of water from the inlet end of the blanching drum 20 into the extension 12 of the tank 7. Immediately under this opening 40 and partially arranged within the drum 20, the end head 9 is provided with a shelf 127 which supports a thermostat 128. The outlet line 129 of this thermostat, as best shown in Fig. 2, extends to an instrument box 130 through which it connects with a line 131 controlling a diaphragm valve 132 in the branch 118 of the steam main 58. The thermostat 128 therefore controls the admission of steam through the pipe 118 to the steam nozzles 117 arranged under the blanching drum 20.

An additional thermostat 135 can be submerged in the water contained in the extension 12 of the tank 7, the outlet line 136 of this thermostat extending to an indicator 137 which indicates the general circulating water temperature of the blancher. This last thermostat is not a controlling thermostat but simply to show, on the indicator 137, the general circulating water temperature of the blancher.

The operation of the blancher is as follows:

While in operation the blanching drum 20 is being rotated on its supporting rolls 18 by the chain drive 39, this also turning the rotary screen 74 and its helical flight 90. The materials to be blanched are fed in a continuous stream to the bar screen 35 which conducts these materials to the lead end of the screw 25. Wash water may be supplied through the pipe 100 and the desired level of the blanching water within the tank 7 is maintained by the float valve 45 which supplies fresh water through the inlet 50. Steam is supplied from the main 58 through the branch 57 and, under control of the diaphragm valve 59, to the pipe 55, this steam emerging through the perforations 56 in this pipe. Likewise, steam is supplied from the main 58 through the branch 118 to the nozzles 117, under control of the diaphragm valve 132, this steam being discharged by the three nozzles or jets 117 into the open ends of the branches 120 of the recirculating conduits. The dam 98 and adjustable overflow pipe 97 are set to waste any desired proportion of the spent blanching water passing into the basin 95, that proportion of the water not wasted through the overflow pipe 97 passing over the overflow dam 98 and being recirculated.

The water from the fresh water inlet 50, wash sprays 101 and any water overflowing the dam 98 flows through the tank 7 toward the inlet end of the rotary drum 20. In so flowing, this water passes the steam pipe 55 and is preheated preparatory to its being used for blanching. The water so flowing through the tank 7 is also agitated by the steam issuing from the perforations 56 and by the rotary movement of the drum 20 so that it is of uniform temperature before flowing through the opening 60 and then being admitted, through the bar screen 35, to the inlet of the drum 20. As the lower part of the helical screw or strip 25 is immersed in this water, each rotation of the lead end of the screw 25 picks up a batch of the material to be blanched as well as enough preheated water to cover this material. The successive batches picked up by the lead end of the screw 25 are then positively advanced by the screw to the discharge end of the drum 20, these batches being subjected to the heat of the steam issuing from the steam pipe 55 and being blanched. By providing a screw conveyer, as shown, the material to be blanched is positively controlled, this being effected by adjusting the speed of rotation of the drum 20 and hence it will be seen that a definite blanching time is provided. Following the first few perforated convolutions of the screw or helical strip 25, the batches of material and blanching water are kept entirely separate from one another during the blanching operation. It will be seen that by so blanching in separate batches the danger of contamination is reduced and is entirely eliminated if all of the spent blanching water received in the basin 95 is wasted. As each batch passes beyond the final helix or convolution of the screw 25, a part of this batch is picked up by the bucket 71 and when this bucket reaches the top of the drum the material so picked up is discharged into the rotary screen 74. The bucket 72 similarly picks up another part of each batch delivered by the screw 25 to the discharge end of the drum 20 and the remainder of this batch is similarly picked up and discharged into the screen 74 by the third bucket 73. The water from the material so discharged onto the rotary screen by the buckets 71, 72 and 73 passes through the rotary screen 74 into the small trough 91 and flows over this trough and through the openings 94 provided in the bottom thereof into the basin 95. All of this spent water received in the basin 95 can be wasted through the adjustable overflow pipe 97 by the simple expedient of turning it to an inverted position. If it is desired to reuse any proportion of this spent water, the adjustable overflow pipe 97 and dam 98 are adjusted so that a part of this spent water is returned to the tank 7. The blanched materials retained upon the rotary screen 74 are picked up by the helical flight 90 and conducted lengthwise through the discharge opening 87. In so passing through the screen 74 the blanched material is subjected to the washing action of the sprays 101, these sprays serving to cool the blanched materials and at the same time the spray water being heated by the blanched materials. This spray water, together with any debris washed from the blanched materials, flows onto the removable screen 103 which catches any debris, the wash water joining the fresh and recirculated water and being used for blanching purposes. It will also be noted that the form of the head 86 insures the draining of the blanched material and the return of substantially all the wash water to the removable screen 103 which can be easily removed for the purpose of cleaning the same.

With the water and the materials to be blanched passing through the apparatus as above described, it will be seen that a constant blanching temperature is maintained. In the event that the temperature of the water discharged from the blanching drum against the thermostat 110 drops below the setting of this thermostat, the pressure in the outlet lines 111 and 113 of the thermostat is adjusted to open the diaphragm valve 59 and admit more steam to the pipe 55 under the blanching drum 20. This increased amount of steam issues from the orifices 56 in this pipe and hence raises the temperature of the blanching water passing through the drum 20 until the temperature of the spent blanching water discharged from this drum against the thermostat 110 is brought up to the setting of this thermostat. It will therefore be seen that the thermostat 110 serves to control the blanching temperature.

The general circulating water temperature of the water, through the thermostat 135 and its outlet line 136, can be read on the indicator 137.

If the articles to be blanched are relatively cold, as is normally the case, they quickly cool the water entering the inlet end of the blanching drum 20 below the setting of the thermostat 128. This thermostat thereupon, through its outlet lines 129 and 131, opens the diaphragm valve 132 in the branch 118 of the steam main 58 and this steam is discharged through the three nozzles 117 below the feed end of the blanching drum 20. This discharge of steam induces a flow of blanching water from the tank 7 into the horizontal branches 120 of the recirculation conduits, this blanching water flowing past the trap doors 125 in the upper branches 123 of these conduits directly into the inlet end of the blanching drum 20. This water is, of course, heated by the steam which induced its flow and on entering the blanching drum 20 flows through the perforations 115 in the first few convolutions of its screw 25 and through the perforations 116 in that portion of the drum containing these first few convolutions to be recirculated by the steam issuing from the nozzles or jets 117.

It will therefore be seen that the steam nozzles 117 maintain a constant localized recirculation of the blanching water through the conduits 120, 123, and the perforations 115, 116 in the feed end of the drum 20 and in its first few convolutions. As this localized recirculating blanching water is heated by the steam jets which induce its recirculation, it will be seen that the articles to be blanched are rapidly brought up to proper blanching temperature. This permits of a material shortening of the length of the blanching drum 20 since without this localized recirculation and heating of the blanching water, the preheating of the vegetables had to be effected solely through heat derived from the steam pipe 55 and hence the individual batches of water and vegetables had to travel a great distance through the blanching drum before they were brought up to blanching temperature.

If a batch of still lower temperature vegetables is fed to the blanching drum, this lower temperature is immediately reflected in the thermostat 128, which, through its outlet lines 129 and 131, adjusts the diaphragm valve 132 to admit still more steam to the nozzles or jets 117. This effects a more rapid localized recirculation of the blanching water through the perforated feed end of the blanching drum 20 and also increases its temperature so as to insure that the colder batch of vegetables is brought up to blanching temperature with the same amount of travel through the blanching drum as warmer vegetables.

It will therefore be seen that the localized recirculation of separately heated water through the inlet end of the blanching drum decreases the necessary length of the blanching drum and that the separate thermostat control of the temperature of this locally recirculated water renders the apparatus extremely sensitive to changes in temperature of the articles being handled; insures proper preheating within a definite space in the blanching drum and also provides greater uniformity in the entire blanching or treating operation.

I claim as my invention:

1. Apparatus for treating foodstuffs, comprising a tank adapted to contain a body of treating liquid in its bottom, an open ended drum arranged in said tank and rotatable about a substantially horizontal axis and having its lower part submerged in said body of treating liquid, a helix secured to the inside of said drum and forming a helical channel along the inner face thereof, means for rotating said drum about said axis, said drum at the leading end of said helix being perforated to permit the circulation of said treating liquid therethrough, means for feeding foodstuffs to the leading end of said helix to be conveyed with said treating liquid to the opposite end of said drum, means adjacent said feeding means for heating and effecting a localized recirculation of the body of said treating liquid contained in the leading end of said helix through said perforations and through the body of liquid in the bottom of said tank to rapidly heat the foodstuffs so fed to the treating temperature, heating means for maintaining said treating temperature of said foodstuffs and treating liquid during the continued movement thereof through said drum, and means at the opposite end of said drum for separating the treated foodstuffs and liquid from each other.

2. Apparatus for treating foodstuffs, comprising a tank adapted to contain a body of treating liquid in its bottom, an open ended drum arranged in said tank and rotatable about a substantially horizontal axis and having its lower part submerged in said body of treating liquid, a helix secured to the inside of said drum and forming a helical channel along the inner face thereof, means for rotating said drum about said axis, said drum and helix at the leading end of said helix being perforated to permit the circulation of said treating liquid therethrough, means for feeding foodstuffs to the leading end of said helix to be conveyed with said treating liquid to the opposite end of said drum, means adjacent said feeding means for heating and effecting a localized recirculation of the body of said treating liquid contained in the leading end of said helix through said perforations and through the body of liquid in the bottom of said tank to rapidly heat the foodstuffs so fed to the treating temperature, heating means for maintaining said treating temperature of said foodstuffs and treating liquid during the continued movement thereof through said drum, and means at the opposite end of said drum for separating the treated foodstuffs and liquid from each other.

3. Apparatus for treating foodstuffs, comprising a tank adapted to contain a body of treating liquid in its bottom, an open ended drum arranged in said tank and rotatable about a substantially horizontal axis and having its lower part submerged in said body of treating liquid, a helix secured to the inside of said drum and forming a helical channel along the inner face thereof, means for rotating said drum about said axis, said drum and helix being imperforate the greater part of the length thereof to provide a liquid-tight channel extending circumferentially and lengthwise of said drum to confine and convey said foodstuffs and said treating liquid from the leading end of said helix in batches which are completely independent and separate from one another, said drum at the leading end of said helix being perforated to permit the circulation of said treating liquid therethrough, means for feeding foodstuffs to the leading end of said helix to be conveyed with said treating liquid to the opposite end of said drum, means adjacent said feeding means for heating and effecting a localized recirculation of the body of said treating liquid contained in the leading end of said helix through said perforations and through the body of liquid in the bottom of said tank to rapidly heat the foodstuffs so fed to the treating temperature, heating means for maintaining said treating temperature of said foodstuffs and treating liquid during the continued movement thereof through said drum, and means at the opposite end of said drum for separating the treated foodstuffs and liquid from each other.

4. Apparatus for treating foodstuffs, comprising a tank adapted to contain a body of treating liquid in its bottom, an open ended drum arranged in said tank and rotatable about a substantially horizontal axis and having its lower part submerged in said body of treating liquid, a helix secured to the inside of said drum and forming a helical channel along the inner face thereof, means for rotating said drum about said axis, said drum and helix being imperforate the greater part of the length thereof to provide a liquid-tight channel extending circumferentially and lengthwise of said drum to confine and convey said foodstuffs and said treating liquid from the leading end of said helix in batches which are completely independent and separate from one another, said drum and helix at the leading end of said helix being perforated to permit the circulation of said treating liquid therethrough, means for feeding foodstuffs to the leading end of said helix to be conveyed with said treating liquid to the opposite end of said drum, means adjacent said feeding means for heating and effecting a localized recirculation of the body of said treating liquid contained in the leading end of said helix through said perforations and through the body of liquid in the bottom of said tank to rapidly heat the footstuffs so fed to the treating temperature, heating means for maintaining said treating temperature of said foodstuffs and treating liquid during the continued movement thereof through said drum, and means at the opposite end of said drum for separating the treated foodstuffs and liquid from each other.

5. Apparatus for treating foodstuffs, comprising a tank adapted to contain a body of treating liquid in its bottom, an open ended drum member rotatable about a substantially horizontal axis and having its lower part submerged in said body of treating liquid, a helix member secured to the inside of said drum member and forming a helical channel along the inner face thereof, means for rotating said drum member about said axis, said drum at the leading end of said helix member being perforated to permit the circulation of a treating liquid therethrough, means for feeding said foodstuffs and said treating liquid to the leading end of said helix member to be conveyed by the convolutions thereof to the opposite end of said drum, means adjacent said feeding means for heating and effecting a localized recirculation of the body of said treating liquid contained in the leading end of said helix through said perforations of said drum and through the body of liquid in the bottom of said tank to rapidly heat the foodstuffs so fed to the treating temperaure, heating means for maintaining said treating temperature of said foodstuffs and treating liquid during the continued movement thereof through said drum, means responsive to the temperature of said recirculating body of treating liquid for controlling the heating effect of said heating and recirculating means, and mean at said opposite end of said drum for separating the treated foodstuffs and liquid from each other.

6. Apparatus for treating foodstuffs, comprising a tank adapted to contain a body of treating liquid in its bottom, an open ended drum member rotatable about a substantially horizontal axis and having its lower part submerged in said body of treating liquid, a helix member secured to the inside of said drum member and forming a helical channel along the inner face thereof, means for rotating said drum member about said axis, said drum at the leading end of said helix member being perforated to permit the circulation of a treating liquid therethrough, means for feeding said foodstuffs and said treating liquid to the leading end of said helix member to be conveyed by the convolutions thereof to the opposite end of said drum, means adjacent said feeding means for heating and effecting a localized recirculation of the body of said treating liquid contained in the leading end of said helix through said perforations of said drum and through the body of liquid in the bottom of said tank to rapidly heat the foodstuffs so fed to the treating temperature, heating means for maintaining said treating temperature of said foodstuffs and treating liquid during the continued movement thereof through said drum, means responsive to the temperature of said recirculating body of treating liquid for controlling the heating effect of said heating and recirculating means, means at said opposite end of said drum for separating the treated foodstuffs and liquid from each other, and means responsive to the temperature of said separated treating liquid for controlling the heating effect of said heating means for maintaining said treating temperature.

7. Apparatus for treating foodstuffs, comprising a tank adapted to contain a body of treating liquid in its bottom, an open ended drum arranged in said tank and rotatable about a substantially horizontal axis and having its lower part submerged in said body of treating liquid, a helix secured to the inside of said drum and forming a helical channel along the inner face thereof, means for rotating said drum about said axis, said drum at the leading end of said helix being perforated to permit the circulation of said treating liquid therethrough, means for feeding foodstuffs to the leading end of said helix to be conveyed with said treating liquid to the opposite end of said drum, a steam nozzle submerged in said body of liquid adjacent said feeding means, means associated with said steam nozzle for effecting a localized recirculation of the body of said treating liquid contained in the leading end of said helix through said perforations and through the body of liquid in the bottom of said tank, said recirculated liquid being heated through heat derived from the steam issuing from the said nozzle, means for maintaining said treating temperature of said foodstuffs and treating liquid during the continued movement thereof through said drum, and means at the opposite end of said drum for separating the treated foodstuffs and liquid from each other.

8. Apparatus for treating foodstuffs, comprising a tank adapted to contain a body of treating liquid in its bottom, an open ended drum arranged in said tank and rotatable about a substantially horizontal axis and having its lower part submerged in said body of treating liquid, a helix secured to the inside of said drum and forming a helical channel along the inner face thereof, means for rotating said drum about said axis, said drum at the leading end of said helix being perforated to permit the circulation of said treating liquid therethrough, means for feeding foodstuffs to the leading end of said helix to be conveyed with said treating liquid to the opposite end of said drum, a steam nozzle submerged in said body of liquid adjacent said feeding means, means associated with said steam nozzle for effecting a localized recirculation of the body of said treating liquid contained in the leading end of said helix through said perforations and through the body of liquid in the bottom of said tank, said recirculated liquid being heated through heat derived from the steam issuing from the said nozzle, means responsive to the temperature of said recirculating body of liquid and controlling the amount of steam supplied to said nozzle, means for maintaining said treating temperature of said foodstuffs and treating liquid during the continued movement thereof through said drum, and means at the opposite end of said drum for separating the treated foodstuffs and liquid from each other.

9. Apparatus for treating foodstuffs, comprising a tank adapted to contain a body of treating liquid in its bottom, an open ended drum arranged in said tank and rotatable about a substantially horizontal axis and having its lower part submerged in said body of said treating liquid, a helix secured to the inside of said drum and forming a helical channel along the inner face thereof, means for rotating said drum about said axis, said drum at the leading end of said helix being perforated to permit the circulation of said treating liquid therethrough, means for feeding foodstuffs to the leading end of said helix to be conveyed with said treating liquid to the opposite end of said drum, a steam nozzle submerged in said body of liquid below the perforated end of said drum, means associated with said steam nozzle for effecting a localized recirculation of the body of said treating liquid contained in the leading end of said helix through said perforations and through the body of liquid in the bottom of said tank below the perforated end of said drum, said recirculated liquid being heated through heat derived from the steam issuing from the said nozzle, heating means submerged in said body of liquid and arranged below said opposite end of said drum and maintaining said treating temperature of said foodstuffs and treating liquid during the continued movement thereof through said drum, and means at the opposite end of said drum for separating the treated foodstuffs and liquid from each other.

10. Apparatus for treating foodstuffs, comprising a tank adapted to contain a body of treating liquid in its bottom, an open ended drum arranged in said tank and rotatable about a substantially horizontal axis and having its lower part submerged in said body of said treating liquid, a helix secured to the inside of said drum and forming a helical channel along the inner face thereof, means for rotating said drum about said axis, said drum at the leading end of said helix being perforated to permit the circulation of said treating liquid therethrough, means for feeding foodstuffs to the leading end of said helix to be conveyed with said treating liquid to the opposite end of said drum, a steam nozzle submerged in said body of liquid below the perforated end of said drum, means associated with the discharge of said steam nozzle for directing the liquid propelled thereby into the open end of said drum adjacent said feeding means to effect a local recirculation of the body of said treating liquid contained in the leading end of said helix through said perforations and through the body of liquid in the bottom of said tank, said recirculated liquid being heated through heat derived from the steam issuing from the said nozzle, means for maintaining said treating temperature of said foodstuffs and treating liquid during the continued movement thereof through said drum, and means at the opposite end of said drum for separating the treated foodstuffs and liquid from each other.

11. Apparatus for treating foodstuffs, comprising a tank adapted to contain a body of liquid in its bottom, an open ended drum arranged in said tank and rotatable about a substantially horizontal axis and having its lower part submerged in said body of treating liquid, a helix secured to the inside of said drum and forming a helical channel along the inner face thereof, means for rotating said drum about said axis, said drum at the leading end of said helix being perforated to permit the circulation of said treating liquid therethrough, means for feeding foodstuffs to the leading end of said helix to be conveyed with said treating liquid to the opposite end of said drum, a steam nozzle submerged in said body of liquid and arranged adjacent said feeding means, a conduit arranged in line with the discharge from said steam nozzle and having its opposite end arranged to discharge into the adjacent open end of said drum thereby to effect a local recirculation of the body of said treating liquid contained in the leading end of said helix through said perforations and through the body of liquid in the bottom of said tank, said recirculated liquid being heated through heat derived from the said nozzle, means responsive to the temperature of said recirculating body of liquid and controlling the amount of steam supplied to said nozzle, means for maintaining said treating temperature of said foodstuffs and treating liquid during the continued movement thereof through said drum, and means at the opposite end of said drum for separating the treated foodstuffs and liquid from each other.

12. Apparatus for treating foodstuffs, comprising a tank adapted to contain a body of liquid in its bottom, an open ended drum arranged in said tank and rotatable about a substantially horizontal axis and having its lower part submerged in said body of treating liquid a helix secured to the inside of said drum and forming a helical channel along the inner face thereof, means for rotating said drum about said axis, said drum and helix at the leading end of said helix being perforated to permit the circulation of said treating liquid therethrough, means for feeding foodstuffs to the leading end of said helix to be conveyed with said treating liquid to the opposite end of said drum, a steam nozzle submerged in said body of liquid and arranged adjacent said feeding means, a conduit arranged in line with the discharge from said steam nozzle and having its opposite end arranged to discharge into the adjacent open end of said drum thereby to effect a local recirculation of the body of said treating liquid contained in the leading end of said helix through said perforations and through the body of liquid in the bottom of said tank, said recirculated liquid being heated through heat derived from the said nozzle, means responsive to the temperature of said recirculating body of liquid and controlling the amount of steam supplied to said nozzle, means for maintaining said treating temperature of said foodstuffs and treating liquid during the continued movement thereof through said drum, and means at the opposite end of said drum for separating the treated foodstuffs and liquid from each other.

WILLIAM DE BACK.